United States Patent
Goble et al.

(10) Patent No.: US 8,323,364 B2
(45) Date of Patent: Dec. 4, 2012

(54) CONTROL SYSTEM FOR AN ON-DEMAND GAS GENERATOR

(75) Inventors: George H. Goble, West Lafayette, IN (US); Charles R. Allen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 12/183,978

(22) Filed: Jul. 31, 2008

(65) Prior Publication Data

US 2009/0035214 A1    Feb. 5, 2009

Related U.S. Application Data

(60) Provisional application No. 60/953,004, filed on Jul. 31, 2007.

(51) Int. Cl.
*B01J 7/00* (2006.01)
*H01M 8/06* (2006.01)
*C01B 3/36* (2006.01)
*C01B 6/24* (2006.01)
*C01B 3/08* (2006.01)
*C10J 3/46* (2006.01)

(52) U.S. Cl. ............ 48/61; 48/197 R; 423/644; 423/657
(58) Field of Classification Search ............... 48/61
See application file for complete search history.

(56) References Cited

U.S. PATENT DOCUMENTS

| | | | |
|---|---|---|---|
| 150,995 A | | 5/1874 | Zwietusch |
| 767,289 A | * | 8/1904 | Kirkwood ............. 422/117 |
| 2,623,812 A | | 12/1952 | Eborall et al. |
| 3,348,919 A | | 10/1967 | Shumway |
| 3,453,086 A | | 7/1969 | Harm |
| 3,540,854 A | | 11/1970 | Brooke, Jr. et al. |
| 3,554,707 A | | 1/1971 | Holmes et al. |
| 3,594,232 A | | 7/1971 | Spahrbier |
| 3,865,688 A | * | 2/1975 | Kleimola ............. 376/283 |

(Continued)

FOREIGN PATENT DOCUMENTS

CA    2314403    8/2003

(Continued)

OTHER PUBLICATIONS

Machine Translation of JP 2003-012301 A (Oct. 7, 2010).*

(Continued)

*Primary Examiner* — Matthew Merkling
(74) *Attorney, Agent, or Firm* — Maginot, Moore & Beck

(57) ABSTRACT

A self-regulating on-demand gas generator. Generation of gas produced from a reaction is selectively, variably, and spontaneously controlled. A variable volume liquid chamber in communication with the pressure pot allows the volume of liquid reactant in the pressure pot to be varied. The amount of product gas generated in the pressure pot depends on the degree of contact between the solid-like reactant and the liquid reactant. The pressure of the product gas regulates the level of liquid in the pressure pot and thereby regulates the degree of contact between the solid-like reactant and the liquid reactant. A sealed gas chamber sharing a flexible diaphragm with the liquid chamber controls the expandability of the liquid chamber. Manipulating the pressure in the sealed gas chamber or the volume of the liquid reactant affects the pressure at which contact by the reactants will be initiated or terminated and thereby provides the ability to control the reaction.

29 Claims, 1 Drawing Sheet

U.S. PATENT DOCUMENTS

| | | | |
|---|---|---|---|
| 3,985,866 A | | 10/1976 | Oda et al. |
| 4,155,712 A | | 5/1979 | Taschek |
| 4,289,744 A | | 9/1981 | Anderson |
| 4,358,291 A | | 11/1982 | Cuomo et al. |
| 4,426,369 A | * | 1/1984 | Palm .................... 423/574.1 |
| 4,745,204 A | | 5/1988 | Cuomo et al. |
| 5,286,473 A | | 2/1994 | Hasebe et al. |
| 5,593,640 A | * | 1/1997 | Long et al. .................... 422/111 |
| 5,728,464 A | | 3/1998 | Checketts |
| 5,817,157 A | | 10/1998 | Checketts |
| 5,867,978 A | | 2/1999 | Klanchar et al. |
| 6,322,723 B1 | | 11/2001 | Thomas |
| 6,440,385 B1 | | 8/2002 | Chaklader |
| 6,506,360 B1 | * | 1/2003 | Andersen et al. .............. 423/657 |
| 6,582,676 B2 | | 6/2003 | Chaklader |
| 6,638,493 B2 | | 10/2003 | Andersen et al. |
| 6,800,258 B2 | | 10/2004 | Andersen et al. |
| 6,849,274 B1 | | 2/2005 | Whittle |
| 6,899,862 B2 | | 5/2005 | Baldwin et al. |
| 6,969,417 B2 | | 11/2005 | Baldwin et al. |
| 7,008,609 B2 | | 3/2006 | Watanabe et al. |
| 7,144,567 B2 | | 12/2006 | Andersen |
| 7,220,504 B2 | | 5/2007 | Wiesheu |
| 2001/0053346 A1 | | 12/2001 | Baldwin et al. |
| 2002/0048548 A1 | | 4/2002 | Chaklader |
| 2002/0081235 A1 | * | 6/2002 | Baldwin et al. ............... 422/105 |
| 2003/0033991 A1 | | 2/2003 | Cheng |
| 2003/0091878 A1 | | 5/2003 | Rosenfeld et al. |
| 2003/0118505 A1 | | 6/2003 | Andersen et al. |
| 2003/0143155 A1 | | 7/2003 | Andersen et al. |
| 2004/0025808 A1 | | 2/2004 | Cheng |
| 2004/0028600 A1 | * | 2/2004 | Torisu et al. .................. 423/500 |
| 2004/0033194 A1 | | 2/2004 | Amendola et al. |
| 2004/0115125 A1 | | 6/2004 | Andersen |
| 2004/0205997 A1 | | 10/2004 | Youngblood |
| 2004/0208820 A1 | | 10/2004 | Watanabe et al. |
| 2005/0036941 A1 | * | 2/2005 | Bae et al. .................... 423/658.2 |
| 2005/0178061 A1 | * | 8/2005 | Tonca ................................ 48/61 |
| 2005/0232837 A1 | | 10/2005 | Troczynski et al. |
| 2005/0268555 A1 | * | 12/2005 | Amendola et al. ................ 48/61 |
| 2006/0034756 A1 | | 2/2006 | Watanabe et al. |
| 2008/0056986 A1 | | 3/2008 | Woodall et al. |

FOREIGN PATENT DOCUMENTS

| | | | |
|---|---|---|---|
| FR | 2288548 A1 | | 5/1976 |
| JP | 56059601 | | 5/1981 |
| JP | 58055303 | | 4/1983 |
| JP | 2003012301 A | * | 1/2003 |
| WO | WO2004/052775 A1 | | 6/2004 |

OTHER PUBLICATIONS

The BINARY binary alloy database—listing, "SGTE BINARY free binary alloy database—List of systems and phases," [online], undated, [retrieved May 14, 2009] Retrieved from the Internet: <http://www.crct.polymtl.ca/fact/Documentation/BINARY/BINARY_list.htm>.

Al-Ga—Data from BINARY (SGTE) alloy databases, [online], [retrieved May 14, 2009] Retrieved from the Internet: <http://www.crct.polymtl.ca/fact/documentation/BINARY/Al-GA.jpg>.

"Green Technologies: Electric Cars with Hydrogen Fuel Cells," [online], *WIPO Magazine*, Feb. 2007, No. 1, 5 pages.

Biotele, "Soda Can Hydrogen Generator," [online], *Instructables*, Jun. 13, 2007, Retrieved from the Internet: <http://www.instructables.com/id/SODA-CAN-HYDROGEN-GENERATOR/>.

"New aluminum-rich alloy produces hydrogen on-demand for large-scale uses," [online], PHYSORG.COM, Feb. 19, 2008 Retrieved from the Internet: <www.physorg.com/news122655117.html>.

Parmuzina, A.V. et al., "Activation of aluminum metal to evolve hydrogen from water," *International Journal of Hydrogen Energy*, vol. 33, 2008, pp. 3073-3076.

"Kipp's apparatus," [online], undated, [retrieved Nov. 20, 2009]. Retrieved from the Internet: http://en.wikipedia.org/wiki/Kipp's_apparatus.

"Kipp Gas Generator," [online], undated, [retrieved Nov. 23, 2009]. Retrieved from the Internet: http/mattson.creighton.edu/History_Gas_Chemistry/Kipps.html.

Griffin, John Joseph, "Chemical Recreations: A Popular Manual of Experimental Chemistry," published by John Joseph Griffin and Richard Griffin and Co., London, England, 1860, pp. 203, 204, 616-618.

International Preliminary Report on Patentability, dated Jul. 31, 2009, Application No. PCT/US2008/071805.

Data sheet, "Duocel® Aluminum Foam," ERG Materials and Aerospace Corporation, undated, 1 page.

* cited by examiner

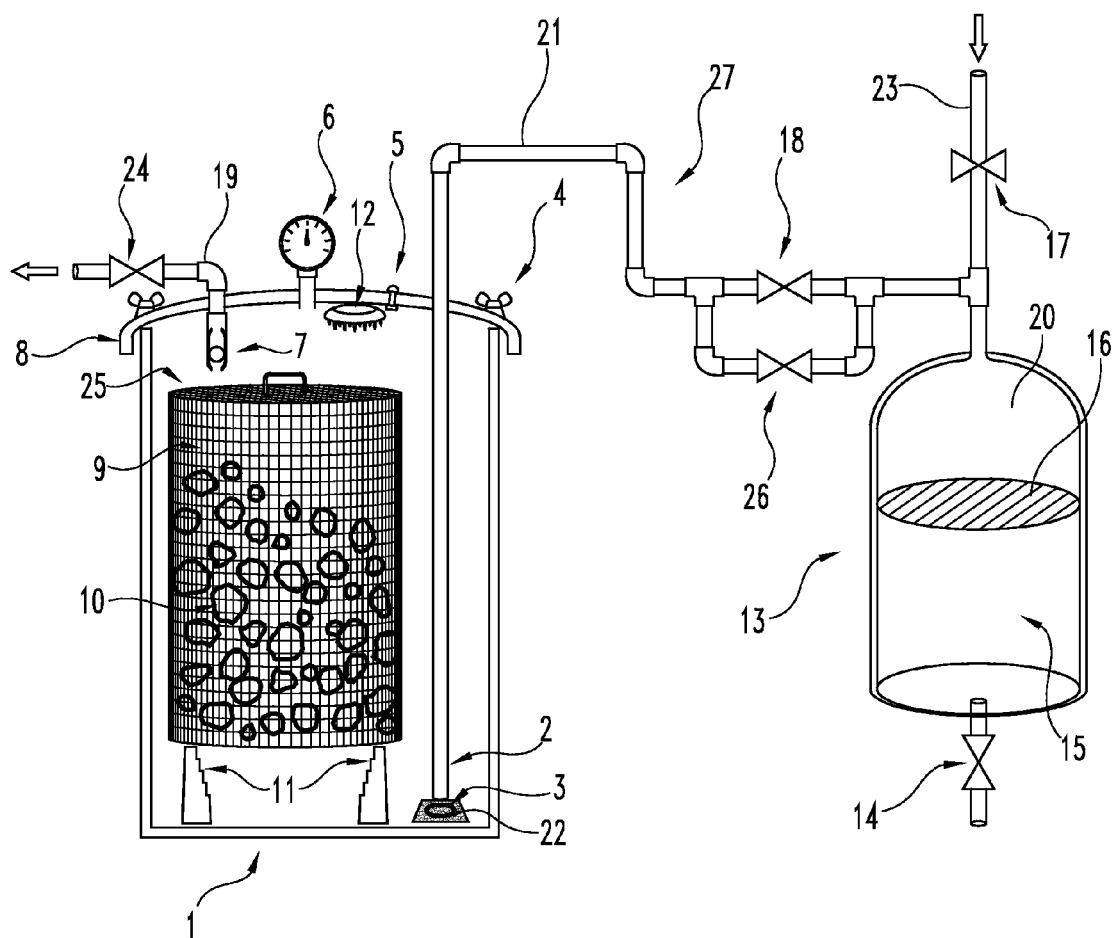

CONTROL SYSTEM FOR AN ON-DEMAND GAS GENERATOR

CROSS-REFERENCE TO RELATED APPLICATION

This application claims the benefit of Provisional Patent Application No. 60/953,004, filed Jul. 31, 2007, which application is hereby incorporated by reference.

BACKGROUND OF THE INVENTION

The present invention relates to the field of gas generation and, more particularly, to an apparatus for controlling the generation of gas from a liquid/solid reaction or the like.

Recent environmental concerns have led to increased focus on developing clean energy production methods to reduce the dependence on oil and to reduce the emission of hydrocarbons thought to be harmful to the environment. One such clean energy source is hydrogen. The main byproduct of hydrogen combustion is water. Generation of fuel grade hydrogen can involve the reaction of an alkali metal or a metal hydride that will react with water to form hydrogen gas. If this reaction is not controlled, the reaction could result in an over-pressurization situation which would be very dangerous.

When generating hydrogen gas from the oxidation of highly reactive metals, it is important to regulate the production rate of the gas. A variable-flow valve can regulate the flow rate at which the gas is delivered for an intended application, but the variable-flow valve without another control mechanism does not regulate the rate at which gas is generated. The maximum flow rate will be dependent on the pressure generated and maintained by the reaction. A separate control mechanism is necessary to manipulate the rate and pressure at which gas is generated. The prior art describes a variety of ways to manipulate a reaction which generates gas.

U.S. Pat. No. 5,728,464 to Checketts discloses a method in which pellets of sodium or other reactive alkaline metals are encapsulated in a thin layer of plastic or aluminum. These pellets float in a pressure tank of water. The tank contains an apparatus to fetch one pellet and to cut the plastic coating or remove the aluminum coating via electrolysis, thus allowing the metal to react with the water and generate hydrogen gas. Pressure sensors stop the pellet cutter or pellet electrolysis apparatus when the high pressure limit is reached, thus stopping gas generation. As the pressure drops to a lower limit due to the consumption of the previously produced hydrogen, the apparatus to remove the protective coating from the reactive pellet is activated. As the pellet is exposed to the liquid reactant the production of hydrogen begins again. This system requires finely tuned pressure sensors and involves complex mechanics.

Various methods exist for metering a liquid, as needed, into a tank of solid reactant mixture or vice versa and controlling the process by monitoring tank pressure. Such methods can have hysteresis issues, especially if the reaction is slow to start. The control system may sense a low gas pressure and add too much of the metered reactant. As a result, the reaction heats up, accelerates, and generates too much gas leading to an over-pressure condition. One example of such a method, disclosed in U.S. Pat. No. 7,144,567 to Andersen et al., involves metering flakes of solid reactant through a hand cranked rotary airlock into a pressurized reaction vessel.

U.S. Pat. No. 5,867,978 to Klanchar et al. discloses metering of a reactant fluid into a reaction pressure vessel. The solid reactants are limited to very high reaction rate substances like lithium, and lithium hydride. The solid reactant is often heated to molten temperatures to provide near instantaneous reaction speeds requiring very complex controls.

U.S. Patent Application Publication No. US2004/0205997A1, published Oct. 21, 2004, in the name of Youngblood, discloses a vertical reactor of two compartments connected by a pipe and valve. Solid reactants are loaded into the lower compartment, with the fluid loaded into the upper compartment. When the valve is opened, the liquid components gravity feed into the lower compartment and the reaction begins. As pressure builds in the lower compartment, the liquid is forced back into the upper compartment, thus uncovering the solid reactants and stopping the reaction.

Eborall et al. discloses in U.S. Pat. No. 2,623,812 that solid reactants may be suspended in an open-bottom cylinder that is immersed in a larger tank of water, and, as the pressure rises due to gas generation, the water level in the cylinder is forced lower, eventually uncovering the solid reactants and stopping the reaction. Eborall et al. only provides for delivery of hydrogen at near atmospheric pressure.

U.S. Pat. No. 3,554,707 to Holmes et al. discloses a gas generator having a bellows to raise or lower the level of water in response to pressure inside the generator. As the gas pressure builds, the bellows expands in response to the increase in pressure and the water level drops. The contact between a fuel cartridge and the water is lost and the reaction is terminated. An enclosure for the bellows has multiple holes in an end wall and a catch to hold the bellows in an expanded position. U.S. Pat. No. 6,800,258 to Andersen et al. shows another bellows system.

The known methods of controlling gas generation involve either overly complex or fragile or expensive mechanisms. Therefore, a need remains for improvements in control systems for on-demand gas generators.

SUMMARY OF THE INVENTION

The present invention provides a self-regulating method and apparatus for generating a gas. One aspect of the present invention is a method which comprises immersing a solid reactant at least partially in a liquid reactant in a container and thereby generating gas, and controlling the reaction by controlling the degree of immersion of the solid reactant in the liquid reactant. The degree of immersion is controlled by adjusting the level of the liquid reactant in the container in response to a change in the pressure of the gas therein, and by applying a counterpressure against the liquid reactant using a sealed auxiliary pressure.

Another aspect of the present invention is a method in which a solid reactant is at least partially immersed in a liquid reactant in an inexpansible container. The reaction is controlled by controlling the degree of immersion of the solid reactant in the liquid reactant. The degree of immersion is controlled by adjusting the level of the liquid reactant in the container in response to a change in the gas pressure therein. The liquid level adjustment includes transferring a portion of the liquid reactant between the container and an expandable external reservoir.

Another aspect of the invention is a method of controlling gas generation by placing a solid-like reactive metal in contact with a liquid oxidizing agent in a controllably sealed pressure pot. Gas product is generated from the reaction initiated upon allowing contact of the solid-like reactive metal, e.g., an alloy, with the liquid oxidizing agent. The gas product is selectively withdrawn, and the pressure increases in the pressure pot when the gas product is not withdrawn. The reaction is controlled by allowing the liquid oxidizing agent to flow from the pressure pot to an expandable fluid reservoir in response to a pressure increase in the pressure pot. The increase in pressure reduces the degree of contact between the solid-like reactive metal and the liquid oxidizing agent, and thus slows the reaction. The method includes using an auxiliary sealed gas pressure source in communication with the expandable fluid reservoir to control the expansion of the fluid chamber. This controls the pressure required to reduce the degree of contact between the solid-like reactive metal and liquid fluid oxidizing agent.

According to a further aspect of the present invention, a self-regulating hydrogen generator has a container capable of holding a solid reactant at least partially immersed in a liquid reactant which reacts with the solid reactant to generate hydrogen, the container adapted to contain the hydrogen under a buildup of pressure. The generator further includes an external reservoir in fluid communication with the container for two-way pressure-responsive transfer of the liquid reactant. The external reservoir includes a sealed auxiliary source of pressure bearing against the portion of the liquid reactant contained in the reservoir.

Yet another aspect of the present invention is a gas generation control apparatus including a pressure pot configured to receive a solid-like reactive metal, and further including a variable-volume fluid chamber and a fluid communication means between the pressure pot and the fluid chamber. A second variable-volume chamber is sealed to contain a pressurized gas and is separated from the fluid chamber by a flexible barrier.

A general object of the present invention is to provide an improved control system for an on-demand gas generator.

Other objects and advantages of the present invention will be more apparent upon reading the following detailed description in conjunction with the accompanying drawing.

BRIEF DESCRIPTION OF THE DRAWING

FIG. 1 is an illustration of one embodiment of a self-regulating on-demand gas generator according to the present invention.

DETAILED DESCRIPTION OF PREFERRED EMBODIMENTS

For the purpose of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

A first embodiment of a control system for an on-demand gas generator provides an apparatus to manipulate the generation of gas produced by reacting a solid-like reactant with a liquid reactant. This apparatus is adjustable to generate gas at a variety of pressures and thereby provide gas for a variety of applications. The apparatus is self-regulating and provides for the gas generating reaction to slow when an upper pressure threshold of gas product exists and allows for the gas generation reaction to speed up when a lower threshold of gas product exists. The manipulation of the reaction includes the ability to select, vary, and spontaneously adjust the upper and lower pressure thresholds of the reaction to generate gas.

The use of aluminum as a means for producing heat and hydrogen has been disclosed in U.S. published patent application number 2008/0056986 A1, the disclosure of which is incorporated herein by reference. The gas is generated when a solid reactant and a liquid reactant come into contact with each other. For example, hydrogen gas may be generated by allowing water to contact aluminum. Gallium, gallium-indium, and other suitable alloys are desirable to use as an aluminum solvent because the gallium inhibits the passivating nature of aluminum oxide. The alloy of aluminum and gallium may form a solid or a solid-like mixture. The term "solid-like" used hereafter shall be understood to mean a traditional solid compound or a mixture in which the oxide forming source material is in its solid-state form and the passivation-preventing solvent is substantially in solid state, but may have some liquid-state inclusions depending on the temperature of the mixture.

FIG. 1 illustrates an embodiment in which a pressure pot 1 is coupled to an expansion tank 13 via a fluid communication means 27. Pressure pot 1 may be a "paint spray pot" commonly used to deliver paint for spraying operations. Pressure pots are usually rated for about 80 psig pressure. One suitable pressure pot is the Graco model 236149, 5 gallon, 100 psig rated, stainless steel, ASME rated. Also suitable are the 10 gallon variety, Graco model 236150, and the 15 gallon variety, Graco model 236151.

The pressure pot 1 is where the reaction that generates gas takes place. Fluid flows between the expansion tank 13 and the pressure pot 1 via the fluid communication means 27. The expansion tank 13 is commonly used in hydronic heating systems or solar thermal hot water systems to allow the working fluid to expand and contract as the temperature changes. One suitable hydronic expansion tank is the Amtrol Extrol model 90 rated at 100 psig, 240 degrees Fahrenheit, and will accept 11.3 gallons of fluid.

The expansion tank consists of a fluid chamber 20 and a second chamber 15. Separating the fluid chamber 20 from the second chamber 15 is a flexible diaphragm 16. The flexible diaphragm 16 can bulge into the fluid chamber 20 thereby enlarging the volume of the second chamber 15 and decreasing the volume of the fluid chamber 20 or the flexible diaphragm can bulge into the second chamber 15 thereby decreasing the volume of the second chamber 15 and enlarging the volume of the fluid chamber 20. The flexible diaphragm should be made of a non-permeable substance such as butyl rubber. The flexible diaphragm 16 provides a substantially fluid-tight and air-tight common border between the fluid chamber 20 and the second chamber 15 of the expansion tank 13.

The fluid chamber 20 and the pressure pot 1 are coupled to a fluid communication means 27 through which fluid passes between the pressure pot 1 and the fluid chamber 20. The fluid communication means 27 may include a variety of fluid control means between the fluid chamber 20 and the pressure pot 1. The fluid communication means may include a pipe 21 or similar connection means like a hose, tubing, or other similar lines. The fluid communication means 27 may also include a valve 18. Valve 18 can be used to selectively restrict the flow of fluid between the fluid chamber 20 and the pressure pot 1.

The fluid chamber 20 may include a port to directly fill the fluid chamber 20 with fluid. FIG. 1 depicts line 23 through which fluid may be loaded into fluid chamber 20. Line 23 may contain a second valve 17 through which the flow of fluid into the fluid chamber 20 can be selectively restricted. Line 23 may be connected to the plumbing of a building, it may be used to funnel fluid into the fluid chamber 20, or line 23 may be connected to another type of fluid reservoir such as a tank when the gas generation control apparatus is used in a mobile setting. Alternatively the pressure pot 1 may be loaded with fluid instead of loading fluid into the fluid chamber 20. Pressure inside the pressure pot 1 can force the fluid through the fluid communication means 27 and into the fluid chamber 20.

The second chamber 15 may contain a pressurized gas. The pressure of the gas can be selected by filling or releasing gas from third valve 14. The higher the gas pressure in second chamber 15, the more the expansion of the fluid chamber will be opposed. A lower gas pressure in second chamber 15 will oppose the expansion of fluid chamber 20 less. Other means of opposing or favoring the expansion of the fluid chamber include coupling the flexible diaphragm with a spring, a weight, a piston system or other similar means. The pressure of the gas inside the second chamber 15 can be adjusted according to the desired pressure of the gas generated inside the pressure pot 1. If a lower buildup pressure of product gas inside the pressure pot 1 is desired, the pressure of the gas inside second chamber 15 can be reduced so that the expansion of the fluid chamber will be opposed less and a lower product pressure inside the pressure pot will cause the some of the fluid reactant to flow through the fluid communication means 27 into the fluid chamber 20. When the reactant pressure is sufficient to cause the fluid reactant and the solid-like reactant to cease contact, the gas generation reaction will stop. The opposite effect can be obtained by selecting a higher pressure of gas inside the second chamber 15 whereby a higher threshold of pressure inside the pressure pot 1 is necessary to force the fluid through the fluid communication means and into the fluid chamber 20. One embodiment of the gas generation control system involves filling the second chamber 15 with gas to obtain 10-12 psig inside the second chamber 15.

The pressure pot 1 may contain a removable lid 8 for filling or cleaning the pressure pot 1. The lid may be secured with wing nuts 4 and bolts to removably and securely fasten the lid 8 to rest of the pressure pot 1. The lid 8 and all other ports in the pressure pot 1 should form a seal capable of maintaining the operating pressure inside the pressure pot and may include O-rings. The lid 8 may contain an over-pressure relief device 5 commonly called a "safety." The over-pressure relief device 5 permits gas to escape if the pressure inside the pressure pot 1 reaches a threshold level which is not desired under normal operating conditions.

The pressure pot 1 may also include a pressure gauge 6 for monitoring the pressure inside the pressure pot. The pressure gauge 6 can be incorporated into the lid 8 as shown in FIG. 1 or another part of the pressure pot 1, and for certain applications it is advantageously capable of measuring positive and negative pressure.

The fluid communication means 27 has a terminal orifice 22 inside the pressure pot 1. The terminal orifice 22 should be positioned at a point below where the solid-like reactant 10 is positioned. In this orientation as the pressure builds from the generation of gas, the increase in pressure will force the some of the fluid through the fluid communication means 27 and the level of the fluid reactant will decrease. If the pressure is sufficient the level of the fluid will drop below the level of the solid-like reactant 10. Separating the reactants will slow the reaction and soon thereafter the reaction will cease if the fluid reactant and the solid-like reactant remain separated. FIG. 1 shows the orifice 22 positioned near the bottom of the pressure pot 1 and connected to a dip tube 2 which may be a part of the fluid communication means 27. The dip tube 2 may also be known as an eductor tube. The dip tube 2 may be coupled to pipe 21 as part of the fluid communication means 27 between pressure pot 1 and fluid chamber 20.

A filter 3 may be included to prevent any solid reaction byproducts from entering the port 22 and reaching the fluid chamber 20. In the embodiment illustrated in FIG. 1 filter 3 is positioned to surround the orifice 22. The filter may be made of cloth, foam, metal or any other suitable strainer means for preventing solid material from entering the fluid chamber 20.

Pressure pot 1 contains a gas line 19 through which the generated gas may flow out. In FIG. 1 the gas product line is illustrated housed in the lid 8. The gas line 19 may include a gas valve for selectively releasing the gas from the pressure pot 1.

The gas line 19 may also contain a floating captive ball check valve 7. If the solid reactants are consumed and product gas continues to be drawn from the pressure pot 1, the water level may rise to the top of the pressure pot, and could exit out the gas line 19. It is undesirable for the fluid reactant to enter an engine or other apparatus drawing the product gas. Incorporating floating captive ball check valve in the gas line 19 can reduce the likelihood of the fluid reactant escaping through the gas line. A floating captive ball check valve is comprised of a floating captive ball which floats up as the fluid level rises may be used to seal the gas line to prevent the egress of fluid. Other floats or mechanisms may also be used as well to prevent egress of fluid. The floating captive ball check valve or other mechanisms should be designed or adjusted so that high flow rates of gas do not unintentionally close the gas line 19.

The disclosed embodiment includes a mechanism to support a solid-like reactant. The mechanism may be a perforated basket 9 in the pressure pot 1 to house the solid-like reactants 10 to be used for gas generation. A stainless steel food strainer about 10 mesh or finer may be used as a perforated basket as an example of inexpensive hardware for the disclosed embodiment. In certain applications involving liquid mixtures, e.g., an aluminum/gallium mixture in a liquid state, approximately 200 mesh may be used. The surface tension of the liquid mixture is sufficient to prevent the liquid mixture from spilling through the mesh, but water, having a much lower surface tension, can penetrate the mesh. The perforated basket 9 may include a lid 25 to prevent the solid-like reactant 10 from floating if the solid reactant is less dense than the fluid reactant. The lid 25 also secures the solid-like reactant inside the perforated basket in the event that the effervescence generated by the reaction becomes vigorous to the point that the effervescence could displace the solid-like reactant from the perforated basket 9. The lid 25 can be detachably secured to the perforated basket 9 by any suitable means. Spacers 11 may be used to locate the strainer at various positions inside the pressure pot 1 (e.g., bottom, middle, and top) and to vary the working volume of the gas generated inside the pressure pot 1. The working volume is the volume of the pressure pot above the liquid reactant. The spacers 11 may be affixed to the bottom or side by any suitable means whereby the position of the perforated basket inside the pressure pot 1 can be varied.

To operate the disclosed gas generator, the solid-like reactant 10 is loaded into the perforated basket 9 and the lid 25 is secured. The valve 18 leading to the expansion tank is closed. The fluid reactant is loaded into the fluid chamber 20 of the expansion tank 13 via valve 17. Valve 17 may be closed after the fluid reactant has been loaded if the fluid reactant volume is to remain fixed during the reaction. The ambient air may be evacuated from the pressure pot 1 through gas line 19 and gas valve 24 by using a vacuum pump. The pressure pot may be evacuated with a vacuum pump. For example, the extent of evacuation may be about 29 inches of vacuum or better (less than 1 percent air remaining). The ambient air should be evacuated to reduce the ambient environmental impurities in the desired reaction product.

The selected volume of the fluid added to the fluid chamber 20 should be balanced with the selected pressure of the gas inside the second chamber. The extent of evacuation in the pressure pot 1 will also affect the flow of the fluid reactant from the fluid chamber 20 to the pressure pot 1. A combination of fluid volume, second chamber pressure, and extent of pressure pot evacuation should be sufficient to force the fluid to enter the pressure pot 1 via the fluid communication means.

The fluid chamber may be loaded by supplying the fluid under pressure such as the pressure supplied by a fluid supply system. In one embodiment the fluid supply system can be a conventional water supply plumbing system. The fluid may also be pumped into the fluid chamber 20 so that the flexible diaphragm bulges into the second chamber 15. The fluid may be funneled into the fluid chamber under atmospheric conditions if the second chamber is not pressurized above atmospheric conditions. The fluid loaded under atmospheric conditions can be charged by subsequently increasing the pressure in the second chamber 15 by adding compressed gas through valve 14. After filling fluid chamber 20 with fluid reactant, any entrapped gas should be bled out of fluid chamber 20 via valve 17 when valve 17 is disconnected from a fluid supply system.

In one embodiment the perforated basket 9 is loaded with an alloy of aluminum and gallium typically, but not limited to, about 80/20 by mass. The fluid chamber 20 is loaded with water. Where an aluminum/gallium alloy is the solid-like solid reactant and water is the fluid reactant, hydrogen gas, aluminum oxide, and heat will be the product of the reaction.

The reaction is ready to begin when the fluid in the fluid chamber is charged relative to the pressure in the second chamber and relative to the vacuum in the pressure pot to sufficiently force the fluid into the pressure pot 1. The reaction will be initiated when the fluid reactant and the solid-like reactant are in contact. Opening valve 18 and allowing the fluid reactant to flow into the pressure pot via the fluid communication means is a possible way to allow the fluid reactant to contact the solid reactant. Gas generation will begin after the fluid reactant contacts the solid reactant.

As gas evolves, it rises to the top, and builds pressure if the gas is not dispersed through valve 24 faster than the gas is generated. As the pressure builds, some of the fluid is forced down in the pressure pot 1, through the fluid communication means 27, and into the expandable fluid reservoir 20 resulting in a lowered level of fluid in the pressure pot. The reaction slows or stops when the pressure inside the pressure pot 1 forces the fluid to a level where the fluid reactant contact with the solid-like reactant is diminished. If additional product gas is not drawn off, the pressure can build to a point where the fluid reactant is no longer in contact with the solid-like reactant and an equilibrium level of the fluid will be reached. The fluid reactant will remain out of contact with the solid-like reactant until a change in the system occurs which brings the fluid reactant back into contact the solid reactant.

When additional product is drawn from valve 24, the resultant decrease in pressure inside the pressure pot will allow the level of the fluid reactant to rise. The fluid is drawn from the fluid chamber 20 and through the fluid communication means 27. The volume of fluid reactant in pressure pot 1 increases. If a sufficient decrease in pressure occurs the fluid reactant contacts the solid reactant, and gas generation begins. The reaction will proceed as previously disclosed until the pressure inside the pressure pot 1 reaches a threshold that is sufficient to expel a volume of fluid reactant from the pressure pot wherein contact between the fluid reactant and the solid-like reactant diminishes.

The system can change in other ways other than drawing off the reactant product whereby the reaction can be initiated or concluded. The system can be altered by adjusting the pressure in the second chamber 15 through adding or releasing air through valve 14. Increasing the pressure in the second chamber 15 can force more fluid to exit the fluid chamber and enter the pressure pot 1. The reaction can be initiated if the fluid level increase is sufficient to initiate contact with the solid-like reactant. Decreasing the pressure in the second chamber 15 can force the fluid to exit the pressure pot 1, enter the fluid reservoir, and the reaction can be concluded if the drop in fluid level in the pressure pot 1 separates the reactants. The volume of fluid reactant can also be adjusted by adding or releasing fluid though valve 17. Adding more fluid to the system can supply more fluid to the pressure pot 1 and initiate the reaction if the increase in fluid is sufficient to initiate contact with the solid-like reactant. Removing fluid from the system can reduce the supply of fluid in the pressure pot and reaction can be concluded if the decrease in fluid level is sufficient to separate the reactants. These manipulations of the reaction parameters provide the ability to select, vary, and spontaneously adjust the upper and lower pressure thresholds of the reaction to generate gas. These manipulations may be made during setup of the system or on-the-fly during operation of the fluid control system.

This embodiment may optionally include fixing a platinum catalyst 12 such as one or more "Hydrocap(s)™" inside the tank. Said catalyst will react any stray oxygen present due to incomplete evacuation or operational error with hydrogen to form water, thus removing the stray oxygen and reducing the explosion hazard if a flashback were to occur from the apparatus (e.g., internal combustion engine) drawing the hydrogen. Platinum catalysts are designed to be used on flooded wet cell deep cycle lead acid batteries and recombine hydrogen and oxygen gases liberated during charging, thus greatly reducing the amount of watering needed. The platinum catalyst 12 should be located above the level where the fluid level is expected to occupy. Fixing the platinum catalyst 12 to the lid 8 is a suitable location.

An additional safety-related option would be to connect a one-way check valve 26 in parallel with valve 18 to allow flow toward the fluid reservoir 20 even if valve 18 were closed. This would eliminate the potential for an operator to inadvertently close valve 18 while the control system is in operation thereby trapping the fluid reactant in the pressure pot 1. The Closing valve 18 without a one-way check valve in place could result in excessive gas pressure buildup in the pressure pot 1. The one-way check valve 26 would allow fluid reactant to flow back to the fluid reservoir 20 even if valve 18 were inadvertently closed and would prevent the build up of gas pressure in the pressure pot.

A temperature control means may be included in the system. The reaction between the solid-like reactant and the fluid reactant is exothermic. Operating the system at a higher reaction rate will cause the temperature inside the pressure pot to increase. The upper limit of the suitable operating temperature and pressure will be determined by the specifications of the pressure pot and the expansion tank chosen to practice the invention. A suitable temperature range when practicing the invention using the disclosed materials is 200-400 degrees Fahrenheit. Some rates of reaction can produce temperatures higher than the suitable operating temperature of the system and a means to control the temperature may be necessary.

A temperature control means may be included to regulate the temperature. In one embodiment the temperature control means is an external cooling jacket wrapped around the outside of the pressure pot 1. The cooling jacket may either have refrigerant flowing through the jacket or the cooling jacket may be a type of heat pipe in which the heat is used to evaporate a coolant in a closed system wherein the heat is dissipated in the condensing area of the heat pipe. In another embodiment the same methods of cooling may also be applied to the inside of the pressure pot. In such an embodiment the pressure pot is be fitted with coils which provide for a flow of coolant to enter and exit the inside of the pressure pot or the coils may be a type of heat pipe wherein the condensing area of the heat pipe is located externally of the pressure pot.

At some temperatures and pressures the fluid reactant may vaporize and exit with product gas if a cooling means is not used to keep the pressure pot 1 below the vaporization temperature of the fluid reactant. Allowing the fluid reactant to leave the pressure pot with the product gas may be acceptable provided accommodations are made for the exit gas to contain both product gas and fluid reactant vapor. A recapture system is implemented in one embodiment where the exit gas is passed through a condenser having a temperature at which the fluid reactant vapor will condense but the product gas will not condense. After passing through the condenser the fluid vapor would be substantially separated from the product gas. The fluid reactant vapor could be collected and supplied back into the system. The fluid reactant should be prevented from dripping onto the solid-like reactants during the re-supply process. Feeding the recaptured fluid reactant into the dip tube 2 would be a suitable re-supply location.

In an alternative embodiment the exiting gas stream composed of both the generated gas and fluid reactant vapor could be used to drive a Stirling engine, steam engine, turbine, expander, or other device to extract useful work from the waste heat. When this technique is implemented the system will eventually need to be re-supplied with fluid reactant. This method and the other methods of removing the heat from the pressure pot can be used as a source for a combined heat and power system.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A self-regulating hydrogen generator, comprising:
a container capable of holding a solid reactant at least partially immersed in a liquid reactant which reacts with said solid reactant to generate a hydrogen gas, and capable of containing said gas under a buildup of pressure, said container having an internal support mechanism for said solid reactant, said internal support mechanism having a circular water-permeable outer side wall or bottom wall;
a liquid reactant reservoir external to said container and capable of holding liquid reactant for supply thereto, said reservoir including a sealed chamber separated by a flexible diaphragm from said liquid reactant contained in said reservoir; and
means for maintaining continuous fluid communication between said container and said reservoir during a buildup of pressure within said container from a minimum to a maximum desired operating pressure.

2. The generator in claim 1, wherein the flexible diaphragm provides a sealed barrier substantially preventing seepage between said sealed chamber and said liquid reactant in said reservoir.

3. The generator in claim 1, wherein said sealed chamber contains a valve.

4. The generator in claim 1, wherein said sealed chamber is configured to contain a gas at approximately 10-12 psig.

5. The generator in claim 1, wherein said sealed chamber is configured to contain a gas at greater than 12 psig.

6. The generator in claim 1, wherein said sealed chamber is configured to contain a gas at 3-10 psig.

7. The generator in claim 1, wherein said container is inexpansible.

8. The generator in claim 1, wherein said support mechanism is a perforated basket.

9. The generator in claim 1, wherein said support mechanism is a means for containing a liquid mixture with a surface tension greater than 100 dyn/cm at the operating temperature of the generator while allowing a liquid with surface tension of 100dyn/cm or lower to pass through.

10. The generator in claim 1, wherein said support mechanism is a mesh container.

11. The generator in claim 10, wherein said support mechanism is a tight-mesh container.

12. The generator in claim 11, wherein at least a portion of said tight-mesh container is approximately 200 mesh.

13. The generator in claim 1, wherein said container has a liquid reactant ingress and egress point below the position of said support mechanism, and said container has a filter covering said point.

14. The generator in claim 1, further including an in-line operating valve in said fluid line permitting two-way fluid communication between said container and said reservoir when said operating valve is open and restricting two-way fluid communication when said operating valve is closed.

15. The generator in claim 14, further including a one-way check valve in parallel with said operating valve.

16. The generator in claim 1, further including a temperature control means for reducing temperature of said container.

17. The generator in claim 1, wherein said container includes a vacuum pump.

18. A self-regulating hydrogen generation control apparatus, comprising:
a pressure pot configured to contain a gas under a buildup of pressure;
a tight-mesh container inside said pressure pot for holding a first reactant which includes a reactive metal element, said container capable of holding said first reactant at least partially immersed in a second, liquid reactant which reacts with said first reactant to generate said gas, said container having a water-permeable radially peripheral outer side wall;
a fluid chamber external to said pressure pot having variable volume and a single fluid port, said fluid port formed in the upper portion of said fluid chamber;
a second chamber that is sealed to contain a pressurized gas and having a variable volume;
a flexible barrier between said fluid chamber and said second chamber; and
a fluid communication means extending from said pressure pot to said fluid chamber.

19. The hydrogen generation control apparatus of claim 18, wherein said tight-mesh container includes means for containing a liquid mixture with a surface tension greater than 100 dyn/cm at the operating temperature of the apparatus while allowing a liquid with a lower surface tension to pass through said tight-mesh container.

20. The gas generation control apparatus of claim 18, wherein at least a portion of said tight-mesh container is approximately 200 mesh.

21. The gas generation control apparatus of claim 18, wherein said fluid communication means is configured to be continuously open throughout self-regulating operation.

22. The gas generation control apparatus of claim 18, wherein said fluid communication means is free of any electronically controlled valve.

23. The gas generation control apparatus of claim 18, wherein said fluid communication means is a continuously open line.

24. The generator in claim 1, wherein said fluid line is a continuously open line.

25. A self-regulating hydrogen generator, comprising:
- a container capable of holding a solid reactant at least partially immersed in a liquid reactant which reacts with said solid reactant to generate a hydrogen gas, and capable of containing said gas under a buildup of pressure, said container having an internal support mechanism for said solid reactant, said internal support mechanism having a water-permeable radially peripheral outer side wall;
- a liquid reactant reservoir external to said container and capable of holding liquid reactant for supply thereto, said reservoir including a sealed chamber separated by a flexible diaphragm from said liquid reactant contained in said reservoir; and
- means for maintaining continuous fluid communication between said container and said reservoir during a buildup of pressure within said container from a minimum to a maximum desired operating pressure.

26. The generator of claim 25, further comprising free space extending radially from said outer side wall of said internal support mechanism to an inner wall of said container.

27. A self-regulating hydrogen generator, comprising:
- a container capable of holding a solid reactant at least partially immersed in a liquid reactant which reacts with said solid reactant to generate a hydrogen gas, and capable of containing said gas under a buildup of pressure, said container having a columnar internal support mechanism for said solid reactant, said internal support mechanism having a water-permeable outer side wall or bottom wall;
- a liquid reactant reservoir external to said container and capable of holding liquid reactant for supply thereto, said reservoir including a sealed chamber separated by a flexible diaphragm from said liquid reactant contained in said reservoir; and
- means for maintaining continuous fluid communication between said container and said reservoir during a buildup of pressure within said container from a minimum to a maximum desired operating pressure.

28. A self-regulating hydrogen generator, comprising:
- a container capable of holding a solid reactant at least partially immersed in a liquid reactant which reacts with said solid reactant to generate a hydrogen gas, and capable of containing said gas under a buildup of pressure, said container having a cylindrical internal support mechanism for said solid reactant, said internal support mechanism having a water-permeable outer side wall or bottom wall;
- a liquid reactant reservoir external to said container and capable of holding liquid reactant for supply thereto, said reservoir including a sealed chamber separated by a flexible diaphragm from said liquid reactant contained in said reservoir; and
- means for maintaining continuous fluid communication between said container and said reservoir during a buildup of pressure within said container from a minimum to a maximum desired operating pressure.

29. A self-regulating hydrogen generator, comprising:
- a container capable of holding a solid reactant at least partially immersed in a liquid reactant which reacts with said solid reactant to generate a hydrogen gas, and capable of containing said gas under a buildup of pressure, said container having a vertically elongate internal support mechanism for said solid reactant, said internal support mechanism having a water-permeable outer side wall or bottom wall;
- a liquid reactant reservoir external to said container and capable of holding liquid reactant for supply thereto, said reservoir including a sealed chamber separated by a flexible diaphragm from said liquid reactant contained in said reservoir; and
- means for maintaining continuous fluid communication between said container and said reservoir during a buildup of pressure within said container from a minimum to a maximum desired operating pressure.

* * * * *